United States Patent Office 3,273,992
Patented Sept. 20, 1966

3,273,992
HERBICIDAL USE OF SUBSTITUTED
METHYLCYCLOHEXENONES
Gino R. Treves, Princeton, N.J., and Kenneth L. Hill,
Lyndonville, and Kenneth P. Dorschner, Middleport,
N.Y., assignors to FMC Corporation, New York, N.Y.,
a corporation of Delaware
No Drawing. Filed Feb. 6, 1962, Ser. No. 171,346
4 Claims. (Cl. 71—2.3)

This invention relates to herbicides based on certain 5-aryl-3-methyl-2-cyclohexen-1-ones, which have shown most unusual effectiveness as pre-emergent herbicides in the control of broadleaf weeds and broadleaf grasses, and are particularly useful in controlling crabgrass in the presence of other grasses.

Crabgrass (*Digitaria sanguinalis*) is a warm weather grass which has been the most resistant intruder into lawns built around ordinary grasses. Much work has been done in attempts to control these intrusions, but no really satisfactory, economical control method has been developed.

We have discovered certain herbicidal compositions which make possible such a satisfactory, economical control method, by reason of the fact that, at relatively low concentrations, they act as very effective pre-emergent herbicides for crabgrass and similar pests without having any substantial toxic effect on most of the ordinary lawn grasses. These compositions are, at the same time, effective pre-emergent herbicides for the control of broadleaf grasses and other broadleaf weeds in a large variety of crop species.

The herbicidal compositions of this invention are based on the 5-aryl-3-methyl-2-cyclohexen-1-ones having the general formula

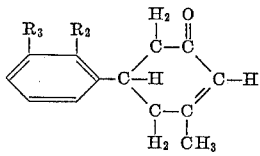

in which (A) one of $R_2$ and $R_3$ is chlorine, bromine, fluorine, methoxy, ethoxy or allyloxy and the other is hydrogen, and (B) $R_2$ and $R_3$ are chlorine, bromine or fluorine, in combination with an inert carrier and preferably a surface active agent.

Compounds of this class when used as pre-emergent herbicides at rather low concentrations (e.g., up to 8 pounds per acre) will act as control agents for crabgrass by virtue of the fact that crabgrass shoots emerge devoid of chlorophyll and die out rapidly while permitting the unaffected, ordinary lawn grasses to grow without interference.

Most of the compounds used in the new herbicides may be prepared by condensing the 2,3-di or 2- or 3-mono-substituted benzaldehydes with ethyl acetoacetate to produce a pentanedioate; most of them can be prepared by cyclizing the diester to a cyclic ester, and finally hydrolyzing the cyclic ester with caustic in aqueous alcohol to produce the desired compound. The method may be exemplified by the following procedure which shows the production of 5-(2-methoxyphenyl)-3-methyl-2-cyclohexen-1-one.

EXAMPLE 1

*Preparation of diethyl-2,4-diacetyl-3-(2-methoxyphenyl)-pentanedioate*

Two hundred forty two grams (1.78 moles) of 2-methoxybenzaldehyde was mixed with 520 g. (4 moles) of ethyl acetoacetate and cooled with ice while 3 ml. of diethyl amine was added. The cold solution was left in an ice bath for several hours and then at room temperature for three days. One ml. of diethyl amine was then added and the following day 2 more ml. of diethyl amine was added. After standing another day, the material crystallized in the flask. A sample of this crystalline material was washed with cold ethanol and dried. It melted at 130°–131.5° C. Analysis.—Calculated: C, 63.48; H, 6.92. Found: C, 63.63; H, 6.96.

*Preparation of 3-methyl-4-ethoxycarbonyl-5-(2-methoxyphenyl)-2-cyclohexen-1-one*

The crude reaction product from the previous reaction was heated at 160°–180° C. under reduced pressure and held at this temperature until it was completely pyrolyzed with elimination of carbon dioxide and ethanol. The product was then distilled, 420 g. (1.46 moles) of material being obtained boiling at 142°–156° C. under 0.07 mm. Hg pressure. Yield=82.0%. Analysis.—Calculated: C, 70.83; H, 6.94. Found: C, 70.59; H, 7.05.

*Preparation of 5-(2-methoxyphenyl)-3-methyl-2-cyclohexen-1-one*

To the 420 g. (1.46 moles) of 3-methyl-4-ethoxycarbonyl-5-(2-methoxyphenyl)-2-cyclohexen-1-one were added 200 g. (5 moles) of sodium hydroxide in 1400 ml. of water and 600 ml. of ethanol. This mixture was refluxed for three hours with stirring. The ethanol was then driven off under reduced pressure, the residue extracted with ether, the ether washed with water, dried over magnesium sulfate, filtered, and the ether driven off under reduced pressure. The oily residue was distilled, 238 g. (1.10 moles) being obtained boiling at 136°–140° C. under 100μ Hg pressure. Yield=61.8%. Analysis.—Calculated: C, 77.74; H, 7.45. Found: C, 77.34; H, 7.48. After standing for several months, the oil crystallized. A sample recrystallized from hexane melted at 45°–47° C.

Many other derivatives can be prepared in the same fashion by starting with a 2,3-di or a 2- or 3-mono-substituted benzaldehyde. In general when freshly prepared they are oily liquids which will eventually crystallize as disclosed in Example 1. However, they may be used in this invention immediately after preparation.

EXAMPLES 2 TO 9

A series of 5-substituted-aryl-3-methyl-2-cyclohexen-1-ones was prepared as in Example 1:

| Example | Substituent | B.P. | C Calcd. | C Found | H Calcd. | H Found |
|---|---|---|---|---|---|---|
| 2 | 2-chloro | 134°/1.4 mm | 70.74 | 71.07 | 5.89 | 6.23 |
| 3 | 3-chloro | 130°/0.15 mm | 70.70 | 70.10 | 5.89 | 5.80 |
| 4 | 2,3-dichloro | M.P.—112–3° | 61.19 | 61.52 | 4.75 | 4.87 |
| 5 | 2-bromo | 140°/0.5 mm | 58.88 | 58.86 | 4.95 | 4.96 |
| 6 | 3-bromo | 156–60°/0.45 mm | 58.88 | 59.31 | 4.95 | 4.87 |
| 7 | 3-methoxy | 148°/0.5 mm | 77.74 | 77.66 | 7.46 | 7.26 |
| 8 | 2-fluoro | 135°/0.65 mm | 74.98 | 75.59 | 6.29 | 6.44 |
| 9 | 2-ethoxy | 130°/0.15 mm | 78.22 | 78.47 | 7.87 | 7.74 |

Where the substituent tends to react in the pyrolysis step, the second and third phases of the reaction are modified. Thus—

EXAMPLE 10

*Preparation of 5-(2-allyloxyphenyl)-3-methyl-2-cyclohexen-1-one*

To 80 g. (0.2 mole) of crude 2,4-diacetyl-3-(2-allyloxyphenyl) pentanedioate (prepared as in Example 1) in 300 ml. of ether and 100 ml. of benzene, 2 ml. of concentrated HCl was added. It was left at room temperature for three days. It was then washed with sodium bicarbonate solution, the solvent eliminated under reduced pressure and the residue refluxed for three hours with a solution of 70 g. of sodium hydroxide in 140 ml. $H_2O$ and 60 ml. ethanol. The ethanol was then eliminated under reduced pressure. The oil was taken up in ether and dried over $MgSO_4$. Since the I.R. spectrum on the residual oil showed the presence of unsaponified ester the hydrolysis was repeated using the same quantities of reagents. Upon distillation of the oil, the 27 g., 55% of product, B.P. 142–150/0.07 mm. was obtained. C calculated 79.30, found 79.48. H calculated 7.48, found 7.62.

EXAMPLE 11

*Preparation of 5-(3-nitrophenyl)-3-methyl-2-cyclohexen-1-one*

Fifty grams (0.126 mole) of diethyl 2,4-diacetyl-3-(3-nitrophenyl) pentanedioate was refluxed for 8 hours with 500 ml. of 40% sulfuric acid. The semi-solid material which was obtained was extracted with ether. The ether was dried over $MgSO_4$. From the ether solution a crystalline material was obtained weighing 2 g. which was the starting material (M.P. 145–7° C.). Upon elimination of part of the ether another crystalline crop was obtained which was dissolved in a mixture of cyclohexane and ether. 17.5 g., 60%, melting at 97–100° C., was obtained. C calculated 67.53, found 68.24. H calculated 5.62, found 5.38.

A number of other 5-aryl compounds which did not give satisfactory control of the crabgrass in the presence of other lawn grasses were also made for comparative purposes and have the following properties:

PRE-EMERGENCE HERBICIDAL ACTIVITY (8 LBS./A.) OF 2-, 3- OR 2,3-SUBSTITUTED ARYLCYCLOHEXENONES

| Example | Percent Kill | | | |
|---|---|---|---|---|
| | Carrot | Lettuce | Crabgrass | Millet |
| A | [1]50 | 0 | [3][5]0 | |
| 1 | 0 | 0 | [5]100 | |
| 2 | 0 | 20 | | [5]100 |
| 3 | 0 | 0 | [4][5]0 | |
| 4 | 0 | 0 | [5]100 | |
| 5 | 0 | 0 | [5]100 | |
| 6 | 0 | 0 | [5]100 | |
| 7 | 0 | 0 | [5]100 | |
| B | 0 | 0 | [2][5]25 | |
| C | 0 | 0 | [1][5]10 | |
| 8 | 0 | 0 | [5]100 | |
| 9 | 0 | 0 | [2][5]70 | |
| 10 | 0 | 0 | [4][5]0 | |
| 11 | 0 | 0 | [2][5]90 | |

[1] Slight damage to surviving plants.
[2] Moderate damage to surviving plants.
[3] Severe damage to surviving plants.
[4] Very severe damage to surviving plants; plants will not survive.
[5] Chlorophyll deficient.

Lima beans, corn, flax and oats were also included in this test, but little to no damage was sustained by any of these crops.

It is particularly noteworthy that the very closely related compounds, Examples A, B and C, show relatively poor activity against crabgrass although they do produce a chlorophyll deficiency. For some reason the 2,3-dimethoxy compound B is much poorer than the 2-methoxy compound.

EXAMPLE 13

Similar tests were made with a number of other related compounds in which the starting material was a substituted benzaldehyde. In each case the identity of the compound was established by infrared analysis.

Chlorine substituted compounds were made with chlorine in the 4-, 2,4-, 2,6- and 3,4-positions. Little or no activity was shown by the 4- or 2,6-substituted products; the 2,4- and 3,4-substituted products showed no activity. This is indeed unusual in view of the activity of the 2,3- and 2,3-chlorine substituted products. Other compounds made and their activities are as follows:

| Example | Substituent | B.P. | C | | H | |
|---|---|---|---|---|---|---|
| | | | Theory | Found | Theory | Found |
| A | None | 126°/0.4 mm | 83.83 | 83.90 | 7.57 | 7.78 |
| B | 2,3-dimethoxy | M.P. 74–6° | 73.15 | 73.31 | 7.36 | 7.37 |
| C | 2-methyl | 130°/0.6 mm | 83.95 | 84.27 | 8.05 | 7.94 |

All of the above compounds were tested for pre-emergent herbicidal activity by the following technique:

EXAMPLE 12

Seeds of the plant species were sown in fumigated silt-sand-loam soil in metal containers 9½″ x 12½″ with the soil 3″ in depth. Individual species were sown at an appropriate depth to encourage optimum germination and growth. Observations were made 15 days after application of the chemical. The chemicals were applied in acetone-water mixtures containing 50 to 75% acetone and the resultant mixture contained 2 pounds of chemical per gallon of solvent. The mixture was sprayed on the soil to produce a concentration of chemical of 8 pounds per acre. The following results were obtained with the chemicals of Examples 1 to 11 and A, B and C.

3,4-dimethoxy—no activity,
3,4,5-trimethoxy—no activity,
2-hydroxy cyclized to another structure and showed no activity,
4-hydroxy—no activity.

All of these results indicate that optimum activity seems to be obtained with 2-substituted compounds, good activity with 3-compound and with 2,3-compounds if the substituents are desired halogens. Other sites are either ineffective or reduce the activity.

Not only are the compounds of this invention highly selective as to crabgrass with respect to most plant group species, but they are highly selective as between crabgrass and the common lawn grasses. The product of Example 1 was applied to a group of twelve grass species as follows:

EXAMPLE 14

Plant species employed were ryegrass, wild oats, crabgrass, yellow foxtail, barnyard grass, German hay millet, giant foxtail, red fescue, Kentucky bluegrass, Highland bent, Johnson grass and nutgrass.

All species except Johnson grass and nutgrass were grown from seed. Johnson grass was grown from rhizomes and nutgrass from tubers. The compounds of Examples 1 and 2 were applied as in Example 12 in acetone-water but the concentration of the chemical was changed to produce a 2 pounds per acre, 4 pounds per acre and 8 pounds per acre application when the solution was applied at the rate of 40 gallons per acre. For comparison, one of the standard crabgrass toxicants, aminotriazole, was applied in the recommended form as a 50% wettable powder in water to give concentrations of 2, 4 and 8 pounds per acre. All of the samples were observed twenty days after treatment. Percentage kill (K) was observed and the vigor (V) of the remaining plants was noted, the numbers indicating the following:

5=all plants normal
4=slight injury, plants are or have recovered
3=moderate injury, plants will probably recover
2=moderate injury, plants will probably not recover
1=severe injury, plants will not recover Example 1 gave the following results:

| Test Plant Species | 2.0 lbs./Acre | | 4.0 lbs./Acre | | 8.0 lbs./Acre | |
|---|---|---|---|---|---|---|
| | V | K | V | K | V | K |
| Ryegrass | 5 | 0 | 5 | 0 | 1 4 | 0 |
| Wild Oats | 5 | 0 | 5 | 0 | 1 4 | 0 |
| Crabgrass | 3 | 0 | ------- | 100 | ------- | 100 |
| Yellow Foxtail | 4 | 0 | 3 | 0 | 1 | 0 |
| Barnyard Grass | 4 | 80 | ------- | 100 | ------- | 100 |
| Millet | 4 | 0 | 4 | 0 | 4 | 0 |
| Giant Foxtail | 4 | 0 | 3 | 90 | 2 | 90 |
| Red Fescue | 5 | 0 | 1 4 | 0 | 1 4 | 0 |
| Kentucky Bluegrass | 4 | 0 | 4 | 0 | 3 | 0 |
| Highland Bent | 1 4 | 0 | 2 | 90 | 1 | 95 |
| Johnson Grass | 5 | 0 | 5 | 0 | 5 | 0 |
| Nutgrass | 5 | 0 | 5 | 0 | 3 | 0 |

[1] Chlorosis limited to grass tips only.

Example 2 gave the following results:

| Test Plant Species | 2.0 lbs./Acre | | 4.0 lbs./Acre | | 8.0 lbs./Acre | |
|---|---|---|---|---|---|---|
| | V | K | V | K | V | K |
| Ryegrass | 5 | 0 | 5 | 0 | 1 4 | 0 |
| Wild Oats | 5 | 0 | 5 | 0 | 5 | 0 |
| Crabgrass | 1 | 90 | ------- | 100 | ------- | 100 |
| Yellow Foxtail | 3 | 0 | 2 | 0 | ------- | 100 |
| Barnyard Grass | ------- | 100 | ------- | 100 | ------- | 100 |
| Millet | 4 | 0 | 3 | 25 | 2 | 95 |
| Giant Foxtail | 3 | 60 | 1 | 95 | ------- | 100 |
| Red Fescue | 5 | 0 | 1 4 | 0 | 3 | 0 |
| Kentucky Bluegrass | 1 4 | 0 | 1 | 95 | ------- | 100 |
| Highland Bent | 3 | 0 | ------- | 100 | ------- | 100 |
| Johnson Grass | 5 | 0 | 5 | 0 | 5 | 0 |
| Nutgrass | 5 | 0 | 5 | 0 | 4 | 0 |

[1] Chlorosis limited to grass tips only.

The high selectivity of the compounds of Examples 1 and 2 should be noted, particularly at the very low concentration of 2 pounds per acre. With the compound of Example 1, very high selectivity is shown in favor of substantially all of the preferred lawn grasses with the exception of Highland bent. The compound of Example 2 shows a high degree of selectivity in favor of all lawn grasses. Compare this with the aminotriazole which shows little to no selectivity—see the following table.

Aminotriazole gave the following results:

| Test Plant Species | 2.0 lbs./Acre | | 4.0 lbs./Acre | | 8.0 lbs./Acre | |
|---|---|---|---|---|---|---|
| | V | K | V | K | V | K |
| Ryegrass | 2 | 50 | 2 | 30 | ------- | 100 |
| Wild Oats | 2 | 80 | 2 | 80 | ------- | 100 |
| Crabgrass | 1 | 95 | 1 | 90 | ------- | 100 |
| Yellow Foxtail | 3 | 0 | 2 | 80 | ------- | 100 |
| Barnyard Grass | ------- | 100 | ------- | 100 | ------- | 100 |
| Millet | ------- | 100 | ------- | 100 | ------- | 100 |
| Giant Foxtail | ------- | 100 | ------- | 100 | ------- | 100 |
| Red Fescue | ------- | 100 | ------- | 100 | ------- | 100 |
| Kentucky Bluegrass | ------- | 100 | ------- | 100 | ------- | 100 |
| Highland Bent | 1 | 95 | ------- | 100 | ------- | 100 |
| Johnson Grass | 1 | 0 | 1 | 0 | 1 | 90 |
| Nutgrass | 2 | 0 | 2 | 0 | ------- | 100 |

Similar tests were run on Examples 5 and 8 with the following results. The chemicals were again run in acetone-water and observations were made twenty-one days after treatment. A somewhat different selection of grasses was made and tests were run at 4 and 8 pounds per acre.

| Test Plant Species (Ex. 5) | 4.0 lbs./Acre | | 8.0 lbs./Acre | |
|---|---|---|---|---|
| | V | K | V | K |
| Red Fescue | 4 | 0 | 4 | 0 |
| Crabgrass | 4 | 40 | 2 | 95 |
| Highland Bent | 4 | 15 | 3 | 0 |
| Merion Blue | 4 | 0 | 4 | 0 |
| Ryegrass | 5 | 0 | 5 | 0 |
| Giant Foxtail | 4 | 10 | 3 | 0 |

| Test Plant Species (Ex. 8) | 4.0 lbs./Acre | | 8.0 lbs./Acre | |
|---|---|---|---|---|
| | V | K | V | K |
| Red Fescue | 5 | 0 | 4 | 0 |
| Crabgrass | 3 | 50 | ------- | 100 |
| Highland Bent | 4 | 0 | 2 | 60 |
| Merion Blue | 4 | 0 | 3 | 0 |
| Ryegrass | 5 | 0 | 4 | 0 |
| Giant Foxtail | 4 | 0 | 3 | 20 |

It will be noted that the bromo compound was very highly selective, even favoring Highland bent, while both compounds show marked selectivity favoring all of the other grasses.

The most common utility for a crabgrass control agent is in preventing crabgrass from taking over an established lawn. To test this possibility, plots of ryegrass and Highland bent grasses were allowed to develop for 12 weeks with periodic clipping. At this point, crabgrass was sown into the established plots and the products of Examples 1 and 2 were applied at the rate of 2, 4, 6 and 8 pounds per acre in acetone-water to the various grasses. At the same time, disodium methylarsonate 12.52% activity was applied as a liquid formulation in water, this being another chemical recommended for the control of crabgrass under the trade name Sodar. The following results were obtained:

EXAMPLE 1

| Test Plant Species | 2.0 lbs./Acre | | 4.0 lbs./Acre | | 6.0 lbs./Acre | | 8.0 lbs./Acre | |
|---|---|---|---|---|---|---|---|---|
| | V | K | V | K | V | K | V | K |
| Ryegrass | 5 | 0 | 5 | 0 | 5 | 0 | 5 | 0 |
| Highland Bent | 5 | 0 | 5 | 0 | 5 | 0 | 5 | 0 |
| Crabgrass | 1 | 90 | ------- | 100 | ------- | 100 | ------- | 100 |

EXAMPLE 2

|  | | | | | | | | |
|---|---|---|---|---|---|---|---|---|
| Ryegrass | 5 | 0 | 5 | 0 | 5 | 0 | 5 | 0 |
| Highland Bent | 5 | 0 | 5 | 0 | 5 | 0 | 5 | 0 |
| Crabgrass | 1 | 90 |  | 100 |  | 100 |  | 100 |

SODAR

|  | | | | | | | | |
|---|---|---|---|---|---|---|---|---|
| Ryegrass | 5 | 0 | 5 | 0 | 5 | 0 | 5 | 0 |
| Highland Bent | 5 | 0 | 5 | 0 | 5 | 0 | 5 | 0 |
| Crabgrass | 5 | 0 | 5 | 0 | 5 | 0 | 5 | 0 |

Note that under these conditions the established grasses are completely unaffected while the crabgrass, which emerges in every case, does so in chlorotic condition, and dies out quickly, generally before it attains one inch in height, so that it is not visible above the top of the established turf.

It should be noted that the compounds of this invention have post-emergent activity and so they can be used in established lawns with crabgrass in them. An indication of the control that can be obtained is shown in the following test:

EXAMPLE 15

Turf grasses used included red clover, red fescue, crabgrass, Kentucky bluegrass, Highland bent and Merion bluegrass. All of the grasses were treated with the product of Example 2 when the plants were three weeks old using the same type of liquid as in Example 12. The following results were obtained:

| Test Plant Species | 3.0 lbs./Acre | | 6.0 lbs./Acre | |
|---|---|---|---|---|
|  | V | K | V | K |
| Red Clover | 3 | 0 | 1 | 95 |
| Red Fescue | 5 | 0 | 4 | 0 |
| Crabgrass | 3 | 90 | 1 | 95 |
| Kentucky Blue | 4 | 0 | 3 | 0 |
| Highland Bent | 4 | 0 | 3 | 50 |
| Merion Blue | 4 | 0 | 3 | 0 |

It will be noted that even post-emergent with the crabgrass seeded at the same time as the other grasses, there is marked selectivity against the crabgrass after three weeks.

A similar test was run on 10 day old plantings. Here the selectivity, particularly at a low rate of 3 pounds per acre, was even more marked.

| Test Plant Species | 3.0 lbs./Acre | | 6.0 lbs./Acre | |
|---|---|---|---|---|
|  | V | K | V | K |
| Red Clover | 3 | 30 | 2 | 80 |
| Red Fescue | 5 | 0 | 4 | 0 |
| Crabgrass | 2 | 95 |  | 100 |
| Kentucky Blue | 4 | 0 | 3 | 0 |
| Highland Bent | 4 | 0 | 3 | 20 |
| Merion Blue | 4 | 0 | 3 | 0 |

Since crabgrass generally appears much later than the ordinary lawn grasses and since established lawn grasses are not affected by the products of this invention, it is thus obvious that application at the proper time of the year can kill such crabgrass without destroying the established grasses.

EXAMPLE 16

The utility of the products of this invention in general weed control was demonstrated in an extensive field test against a number of commercial herbicides. The soil (Dunkirk silt loam) was plowed and disked and into it was drilled a commercial balanced fertilizer. Prior to the final disking, a mixture of weed and grass seeds was sown broadcast over the entire test area and the area disked to assure thorough mixing of these seeds, which included:

Barnyard grass (*Echinochloa crusgalli*)
Foxtail (*Setaria* sp.)
Lamb's-quarters (*Chenopodium album*)
Ragweed (*Ambrosia artemsiifolia*)
Pennsylvania smartweed (*Polygonum pennsylvanicum*)
Pigweed (*Amaranthus retroflexus*)

Plots, each 12 x 12 feet, were staked and planted in accordance with the following table:

| Crop | Variety | Spacing | Depth Planting in inches |
|---|---|---|---|
| Cotton | D, P & L | 5 to 6 seed/hill, hills 8" apart | 1½ |
| Snap beans |  | 1 seed per 3" | 1½ |
| Lima beans | Fordhook—US 242 | do | 1½ |
| Peas | Midfreezer | do | 1½ |
| Soybeans | Chippewa | do | 1½ |
| Peanuts | Virginia Bunch | do | 1½ |
| Corn | Golden Cross Bantam | do | 1½ |
| Flax |  | Measured volume | 1 |
| Sugar beets | U.S. Strain | do | 1 |
| Wheat |  | do | 1 |
| Spinach | 749 America | do | ¾ |
| Lettuce | Salad Bowl | do | ¼ |
| Carrots | Nantes | do | ½ |
| Onions | Sweet Spanish | do | ½ |
| Muskmelons | Delicious 51 | 1 hill; 5 seed/hill | ½ |
| Watermelons | Sugar Baby | do | ½ |
| Cucumbers | Marketer | do | ½ |
| Tomatoes | Red Jacket | 6 to 10 seed/foot | ¾ |
| Alfalfa |  | Measured volume | ¾ |

The larger seeds were counted and planted individually; smaller seeds were measured by volume and the same volume evenly distributed over a 12 foot row of each plot. The depth of planting was dependent on the size of the seed as indicated in the table above.

Prior to herbicidal treatments, rains of 0.15 inch fell on the day of planting, 0.66 inch on the next day and 0.25 inch on the following day on which the herbicides were sprayed. Over an inch of rain fell within the first week after treatment.

At the time of the application of the herbicides, which was held up by the rain and was three days after planting, the corn and wheat were just beginning to emerge and the soybeans were beginning to break ground. The other plants were less advanced. A very few of the weeds and grasses had emerged.

All of the materials were applied by means of a tractor-mounted sprayer at a rate equivalent to 200 gallons per acre. Each of the treatments had four replicates. The product of Example 2, the Sinox P.E. and CIPC, were applied in the form of an emulsifiable concentrate. The diuron and Simazine were applied in the form of a wettable powder. The exact constitution of the commercial products is not known but the label information indicates the following:

Sinox P.E. (triethanolamine salt of 2-(2-butyl)-4,6-dinitrophenol), an emulsifiable concentrate containing the equivalent of 3 lbs./gal. of the phenol.

CIPC (2-propyl N-(3-clorophenyl)carbamate), an emulsifiable concentrate containing 4 lbs./gal.

Diuron (3 - (3,4 - dichlorophenyl)-1,1-dimethylurea), a flowable paste formulation containing 80% active ingredient.

Simazine (2 - chloro-4,6-di(ethylamino)-1,3,5-triazine, a wettable powder containing 80% active ingredient.

The material of Example 2 was applied in the form of an emulsifiable concentrate having the following formula:

| | Percent |
|---|---|
| Toxicant | 47.63 |
| Emcol H300X | 1.75 |
| Emcol H500X (blends of polyoxyethylene glycol ethers combined with calcium salt of oil-soluble sulfonate) | 3.25 |
| Xylene | 47.37 |
| | 100.00 |

In addition to the weed seeds and grasses planted, there were volunteer plants of crabgrass (*Digitaria sanguinalis*) and of purslane (*Portulaca oleracea*). The population of pest plants was about one-sixth grasses and five-sixth broad leaves.

Weed control in the plots was determined 16 days after treatment by an actual count of the number of weed plants in the plot and in the check plot. At the end of nine weeks, the weed control was estimated by appearance. Vigor of the crop plants in the untreated check, as well as in the treated plots was noted at the end of 16 days; however, at the end of nine weeks, the check plots were so over-run with weeds that no vigor ratings could be assigned. The effect of the various treatments on the vigor and stand of the plants is disclosed in the following tables:

VIGORS [1]

| | Product of Example 2 | | | | Sinox PE | | CIPC | | Diuron | | Simazine | |
|---|---|---|---|---|---|---|---|---|---|---|---|---|
| Rate | 8# | | 12# | | 6# | | 6# | | 2# | | 2# | |
| | 16 Days | 9 Wks. | 16 Days | 9 Wks. | 16 Days | 9 Wks. | 16 Days | 9 Wks. | 16 Days | 9 Wks. | 16 Days | 9 Wks. |
| Cotton | 0.8 | 0 | 0.5 | 0 | 2.8 | 2.0 | 2.5 | 2.5 | 5.5 | 3.5 | 8.3 | 2.7 |
| Snap beans | 2.3 | 0.5 | 1.8 | 0.3 | 0.8 | 1.2 | 3.0 | 2.0 | 9.5 | — | 9.3 | 6.0 |
| Lima beans | 2.0 | 0 | 1.8 | 0 | 2.3 | 0.8 | 2.3 | 1.5 | 9.0 | 5.0 | 8.5 | 4.5 |
| Peas | 0.8 | — | 0.8 | — | 2.3 | | 4.0 | — | 9.5 | — | 4.3 | — |
| Soybeans | 0.3 | 0.3 | 0 | 0 | 3.5 | 3.0 | 5.3 | 3.7 | 10.0 | — | 10.0 | — |
| Peanuts | 0.5 | 0 | 1.0 | 0 | 2.5 | 0 | 4.0 | 1.5 | 7.8 | 2.0 | 7.0 | 3.7 |
| Corn | 2.5 | 0.8 | 3.7 | 0 | 3.8 | 2.2 | 5.0 | 2.2 | 8.8 | 5.7 | 1.7 | 1.3 |
| Flax | 0 | 0.5 | 0 | 0 | 2.8 | 1.0 | 5.3 | 6.0 | — | — | 4.0 | 3.5 |
| Sugar beets | 0 | 0 | 0.7 | 0 | — | — | 4.3 | 3.7 | — | — | — | — |
| Wheat | 1.5 | 0 | 2.3 | 0.7 | 3.0 | 0 | 3.5 | 0.5 | 8.0 | 4.2 | 5.0 | 2.0 |
| Spinach | 1.0 | 2.7 | 1.0 | 2.3 | — | — | 2.8 | 4.7 | — | — | — | — |
| Lettuce | 1.0 | 0.5 | 1.3 | 0 | — | — | 1.8 | 1.0 | — | — | — | — |
| Onions | 2.8 | 1.0 | 4.7 | 0 | — | — | 1.0 | 2.5 | 4.8 | — | 6.7 | 4.5 |
| Carrots | 0.8 | 0 | 1.7 | 0 | — | — | 1.5 | 2.5 | — | — | — | — |
| Tomatoes | 2.0 | 1.0 | 3.3 | 0 | — | — | 1.8 | — | — | — | — | — |
| Alfalfa | 1.5 | 2.0 | 4.0 | 0 | — | — | 2.3 | 2.0 | — | — | — | — |
| Muskmelon | 4.0 | 0 | 5.3 | 0 | 3.0 | 1.7 | 5.0 | — | 5.0 | — | 3.3 | — |
| Watermelon | 2.0 | 0 | 4.5 | 0 | 1.0 | 0 | 4.5 | — | — | — | — | — |
| Cucumber | 2.5 | 0 | 2.3 | 0 | 2.5 | 2.5 | 7.3 | — | 4.5 | — | 3.3 | — |

[1] Vigor rating:
0 = no injury.
1, 2, 3 = slight injury.
4, 5, 6 = moderate injury.
7, 8, 9 = severe injury.
10 = plants dead.
— = no plants present.

STANDS [1]

| | Product of Example 2 | | | | Sinox PE | | CIPC | | Diuron | | Simazine | |
|---|---|---|---|---|---|---|---|---|---|---|---|---|
| Rate | 8# | | 12# | | 6# | | 6# | | 2# | | 2# | |
| | 16 Days | 9 Wks. | 16 Days | 9 Wks. | 16 Days | 9 Wks. | 16 Days | 9 Wks. | 16 Days | 9 Wks. | 16 Days | 9 Wks. |
| Cotton | 137.0 | 95.0 | 133.0 | 90.0 | 113.0 | 81.2 | 104.0 | 87.0 | 92.0 | 50.7 | 108.0 | 10.0 |
| Snap beans | 95.0 | 92.5 | 86.0 | 100.0 | 93.0 | 97.5 | 102.0 | 100.0 | 90.0 | 0 | 89.0 | 1.0 |
| Lima beans | 89.0 | 98.7 | 106.0 | 100.0 | 89.0 | 100.0 | 95.0 | 100.0 | 95.0 | 2.0 | 103.0 | 12.5 |
| Peas | 100.0 | — | 90.0 | — | 90.0 | 0 | 96.0 | — | 66.0 | — | 93.0 | — |
| Soybeans | 83.0 | 98.7 | 81.0 | 100.0 | 38.0 | 64.0 | 76.0 | 60.0 | 71.0 | 0 | 76.0 | 0 |
| Peanuts | 100.0 | 100.0 | 96.0 | 98.3 | 84.0 | 90.0 | 90.0 | 84.0 | 110.0 | 1.2 | 91.0 | 27.0 |
| Corn | 109.0 | 100.0 | 109.0 | 100.0 | 83.0 | 95.0 | 93.0 | 85.0 | 55.0 | 6.5 | 107.0 | 100.0 |
| Flax | 96.0 | 87.5 | 122.0 | 98.3 | 4.0 | 5.0 | 71.0 | 0.75 | 0 | 0 | 2.0 | 3.0 |
| Sugar beets | 29.0 | 59.5 | 29.0 | 90.0 | 0 | 0 | 62.0 | 12.0 | 0 | 0 | 0 | 0 |
| Wheat | 107.0 | 100.0 | 112.0 | 96.7 | 95.0 | 100.0 | 104.0 | 100.0 | 68.0 | 27.5 | 74.0 | 89.0 |
| Spinach | 107.0 | 48.2 | 135.0 | 88.3 | 0 | 0 | 142.0 | 51.5 | 0 | 0 | 0 | 0 |
| Lettuce | 48.0 | 37.0 | 32.0 | 35.0 | 0 | 0 | 72.0 | 37.5 | 0 | 0 | 0 | 0 |
| Onions | 101.0 | 80.0 | 95.0 | 96.7 | 0 | 0 | 83.0 | 81.2 | 20.0 | 0 | 39.0 | 2.1 |
| Carrots | 131.0 | 100.0 | 141.0 | 98.3 | 0 | 0 | 108.0 | 80.7 | 0 | 0 | 0 | 0 |
| Tomatoes | 27.0 | 32.0 | 45.0 | 65.0 | 0 | 0 | 12.0 | 0 | 0 | 0 | 0 | 0 |
| Alfalfa | 7.0 | 17.0 | 3.0 | 16.7 | 0 | 0 | 44.0 | 45.0 | 0 | 0 | 0 | 0 |
| Muskmelon | 82.0 | 75.0 | 100.0 | 100.0 | 40.0 | 100.0 | 93.0 | 0 | 32.0 | 0 | 18.0 | 0 |
| Watermelon | [2]100.0 | 50.0 | [2]100.0 | 100.0 | [2]100.0 | 100.0 | [2]100.0 | 0 | 0 | 0 | 0 | 0 |
| Cucumber | 93.0 | 75.0 | 65.0 | 66.7 | 55.0 | 100.0 | 160.0 | 0 | 10.0 | 0 | 30.0 | 0 |

[1] As percentage of stand in untreated.
[2] No emergency in the untreated check.

The weed control is shown in the following table:

| Treatment | Rate, Lb./A. | Percent Control 16 Days | | Percent Control 9 Weeks Annual Broadleaved Weeds and Grasses |
|---|---|---|---|---|
| | | Annual Broadleaved Weeds | Annual Grasses | |
| Example 2 | 8 | 97.3 | 67.6 | 94.0 |
| Example 2 | 12 | 97.5 | 86.2 | 95.5 |
| Sinox PE | 6 | 99.0 | 81.5 | 96.5 |
| CIPC | 6 | 88.8 | 100.0 | 71.5 |
| Diuron | 3 | 99.0 | 100.0 | 99.5 |
| Simazine | 2 | 99.0 | 92.6 | 97.0 |

It will be noted that the product of Example 2 is useful with a far greater variety of plants than any of the four commercial products compared with it.

The toxicants of this invention, like most agricultural chemicals, are generally not applied full strength. They are generally incorporated in any of the adjuvants and carriers normally employed for facilitating the dispersion of active ingredients for agricultural chemical applications, recognizing the accepted fact that the formulation and mode of application of the toxicant may affect the activity of the material for pre-emergent application. These compounds may be applied as sprays, dusts or granules to the area in which dispersion of vegetation is desired. They may be formulated as granules of large particle size, as powdery dusts, as wettable powders, as emulsifiable concentrates or as solutions.

Dusts are admixtures of the active ingredients with finely divided solids such as talc, attapulgite clay, kieselguhr, pyrophyllite, chalk, diatomaceous earths, calcium phosphates, calcium and magnesium carbonates, sulfur, lime, flours, and other organic or inorganic solids which act as dispersants and carriers for the toxicant. These finely divided solids have an average particle size less than about 50 microns. A typical dust formulation useful herein contains, for example, 10.0 parts of toxicant, 30.0 parts of bentonite clay and 60.0 parts talc.

Wettable powders, also useful formulations for both pre- and post-emergent herbicides, are in the form of finely divided particles which disperse readily in water or other dispersant. The wettable powder is ultimately applied to the soil either as a dry dust or as an emulsion in water or other liquid. Typical carriers for wettable powders include fuller's earth, kaolin clays, silicas, and other highly absorbent, readily wet inorganic dilutants. Wettable powders normally are prepared to contain about 5–50% of active ingredient, depending on the absorbency of the carrier, and usually also contain a small amount of a wetting, dispersing or emulsifying agent to facilitate dispersion. For example, a useful wettable powder formulation contains 25.0 parts of toxicant, 72.0 parts of bentonite clay and 1.5 parts each of sodium lignosulfonate and sodium laurylsulfonate as wetting agents.

Other useful formulations for herbicidal application are the emulsifiable concentrates, which are homogeneous liquid or paste compositions which are readily dispersed in water or other dispersant, and may consist entirely of the toxicant with a liquid or solid emulsifying agent, or may also contain a liquid carrier, such as xylene, heavy aromatic naphthas, isophorone and other non-volatile organic solvents. For herbicidal application these concentrates are dispersed in water or other liquid carrier, and normally applied as a spray to the area to be treated. The percentage by weight of the essential active ingredient may vary according to the manner in which the composition is to be applied but in general comprises 0.5 to 95 percent by weight of the herbicidal composition.

Typical wetting, dispersing or emulsifying agents used in agricultural formulations include, for example, the alkyl and alkylaryl sulfonates and sulfates and their sodium salts, alkylamide sulfonates sulfonates, including fatty methyl taurides; alkylaryl polyether alcohols; sulfated higher alcohols, polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from 1 percent to 15 percent by weight of the herbicidal composition.

Other useful formulations for herbicidal applications include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used.

The herbicidal compositions may be formulated and are applied with insecticides, fungicides, nematocides, plant growth regulators, fertilizers, etc. In applying the chemicals it is obvious that a herbicidal amount and concentration of toxicant should be employed.

It is apparent that various modifications may be made in the formulation and application of the herbicide of this invention, without departing from the novel concept herein, as defined in the following claims:

We claim:
1. The method of destroying weeds in the presence of desired crop species which comprises applying an herbicidal amount and concentration, to the locus to be protected, of a compound having the formula

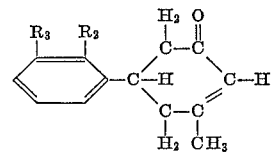

in which (A) one of $R_2$ and $R_3$ is selected from the group consisting of chlorine, bromine, fluorine, methoxy, ethoxy and allyloxy and the other is hydrogen, and (B) $R_2$ and $R_3$ are selected from the group consisting of chlorine, bromine or fluorine.

2. The method of destroying crabgrass in the presence of other grass species which comprises applying an herbicidal amount and concentration, to the locus to be protected, of a compound having the formula

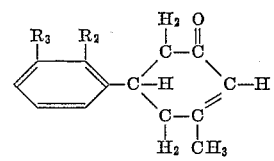

in which (A) one of $R_2$ and $R_3$ is selected from the group consisting of chlorine, bromine, fluorine, methoxy, ethoxy and allyloxy and the other is hydrogen, and (B) $R_2$ and $R_3$ are selected from the group consisting of chlorine, bromine or fluorine.

3. The method of destroying crabgrass in the presence of other grass species which comprises applying an herbicidal amount and concentration, to the locus to be protected, of 5-(2-methoxyphenyl)-3-methyl-2-cyclohexen-1-one.

4. The method of destroying crabgrass in the presence of other grass species which comprises applying an herbicidal amount and concentration, to the locus to be protected, of 5-(2-chlorophenyl)-3-methyl-2-cyclohexen-1-one.

References Cited by the Examiner

UNITED STATES PATENTS

| | | | |
|---|---|---|---|
| 2,887,479 | 5/1959 | Haseltine | 260—590 X |
| 2,957,918 | 10/1960 | Smutny et al. | 260—590 |
| 2,969,397 | 1/1961 | Guex | 260—590 |
| 3,007,788 | 11/1961 | Josephs | 71—2.3 |
| 3,067,022 | 12/1962 | Nault | 71—2.3 |

OTHER REFERENCES

Agriculture Handbook No. 69, pages 6, 7 and 142, May 1952.

Chemicals Evaluated as Insecticides and Repellants at Orlando, Florida, by W. V. King.

LEWIS GOTTS, *Primary Examiner.*

JULIAN S. LEVITT, JAMES O. THOMAS, JR.,

*Examiners.*

A. J. ADAMCIK, *Assistant Examiner.*